(12) United States Patent
Larochelle et al.

(10) Patent No.: US 9,162,721 B2
(45) Date of Patent: Oct. 20, 2015

(54) ROBOTIC WALKING APPARATUS

(75) Inventors: Pierre Larochelle, West Melbourne, FL (US); Oliver Zimmerman, Melbourne, FL (US); Jennifer Mori, San Jose, CA (US); Cassandra Scully, Tarrytown, NY (US); Christina Lucas, Cincinnati, OH (US); Jacob Sleight, Newark, NY (US); Garrett Lee, Bellefonte, PA (US)

(73) Assignee: Florida Institute of Technology, Inc., Melbourne, FL (US)

(*) Notice: Subject to any disclaimer, the term of this patent is extended or adjusted under 35 U.S.C. 154(b) by 333 days.

(21) Appl. No.: 13/369,467

(22) Filed: Feb. 9, 2012

(65) Prior Publication Data

US 2012/0312606 A1    Dec. 13, 2012

Related U.S. Application Data

(60) Provisional application No. 61/440,897, filed on Feb. 9, 2011.

(51) Int. Cl.
*B62D 57/02* (2006.01)
*B62D 57/032* (2006.01)

(52) U.S. Cl.
CPC .............. *B62D 57/032* (2013.01); *B62D 57/02* (2013.01)

(58) Field of Classification Search
CPC .............................. B62D 57/02; B62D 57/032
USPC ................... 180/8.1, 8.5, 8.6; 901/1
See application file for complete search history.

(56) References Cited

U.S. PATENT DOCUMENTS

| | | | | |
|---|---|---|---|---|
| 792,403 | A * | 6/1905 | Crosse | 280/206 |
| 3,134,453 | A * | 5/1964 | Cirami | 180/8.6 |
| 3,331,463 | A * | 7/1967 | Kramer | 180/8.6 |
| 3,378,092 | A * | 4/1968 | Ilon | 180/8.1 |
| 4,365,437 | A * | 12/1982 | Jameson | 446/355 |
| 4,511,011 | A * | 4/1985 | Bartholet | 180/8.6 |
| 4,629,440 | A * | 12/1986 | McKittrick et al. | 446/356 |
| 5,121,805 | A * | 6/1992 | Collie | 180/8.1 |
| 5,158,493 | A * | 10/1992 | Morgrey | 446/355 |
| 5,219,410 | A * | 6/1993 | Garrec | 180/8.1 |
| 5,423,708 | A * | 6/1995 | Allen | 446/356 |
| 5,484,031 | A * | 1/1996 | Koyachi et al. | 180/8.1 |
| 6,213,715 | B1 * | 4/2001 | Larochelle et al. | 416/110 |
| 6,491,119 | B1 * | 12/2002 | Neu | 180/8.1 |
| 6,831,437 | B2 * | 12/2004 | Filo | 318/568.12 |
| 7,726,422 | B2 * | 6/2010 | Sun et al. | 180/7.1 |
| 8,157,031 | B2 * | 4/2012 | Xu | 180/8.1 |
| 2004/0063382 | A1 * | 4/2004 | Randall | 446/377 |
| 2007/0215394 | A1 * | 9/2007 | Sun et al. | 180/8.1 |
| 2008/0083571 | A1 * | 4/2008 | Troy | 180/7.1 |
| 2008/0150465 | A1 * | 6/2008 | Baba et al. | 318/568.12 |

(Continued)

OTHER PUBLICATIONS

Lee et al., SphereWalker, May 20, 2010, 2010 Conference on Recent Advances in Robotics.*

(Continued)

*Primary Examiner* — Anne Marie Boehler
*Assistant Examiner* — Maurice Williams
(74) *Attorney, Agent, or Firm* — Stephen C. Thomas

(57) ABSTRACT

A bipod robotic walking apparatus consisting of two feet on the coupler link of a spherical four-bar linkage, for movement in a forward or rearward direction by repeated motions of the four-bar linkage. Three four-bar linkages may be connected in tandem to form a hexapod with three points of contact with the ground.

18 Claims, 8 Drawing Sheets

(56) References Cited

U.S. PATENT DOCUMENTS

| | | | |
|---|---|---|---|
| 2008/0203955 A1* | 8/2008 | Gomi et al. | 318/568.12 |
| 2009/0038421 A1* | 2/2009 | Wilson et al. | 74/33 |
| 2009/0038863 A1* | 2/2009 | Hillis et al. | 180/8.6 |
| 2009/0039819 A1* | 2/2009 | Wilson et al. | 318/568.12 |
| 2009/0301798 A1* | 12/2009 | Yang et al. | 180/8.6 |
| 2009/0321150 A1* | 12/2009 | Kwon et al. | 180/8.6 |
| 2011/0048815 A1* | 3/2011 | Xu | 180/8.1 |

OTHER PUBLICATIONS

DETC2011/MECH-47093, Sperewalker: A Hexapod Walking Machine, Aug. 29-31, 2011, Washington DC.

* cited by examiner

ROBOTIC WALKING APPARATUS

The present application claims priority to U.S. Provisional Application Ser. No. 61/440,897, filed 2011 Feb. 9.

FIELD OF THE INVENTION

A bipod robotic walking apparatus with two integrated feet, designed for contact with a firm surface, for example the ground or other ground like surface, and attached to a body for movement in a forward or rearward direction by repeated motions of the robotic walking apparatus.

BACKGROUND OF THE INVENTION

There have been many attempts to make walking apparatus-like mechanical systems for propelling objects ranging from robotic vehicles to toy bugs. However, a problem persisting in complexity and efficiency is providing power to the robotic walking apparatuses, particularly in the case of multiple walking apparatuses. A design achievement in any device using energy is simplification by reducing the number of operating parts to a minimum sustainable number so the functional relationships and operating range of the component parts are minimized, reducing operating space and energy consumption.

SUMMARY OF THE INVENTION

The invention as shown according to the disclosed inventive principles, is a bipod robotic walking apparatus comprising as a primary element, a bipod robotic walking apparatus consisting of two feet on the coupler link of a spherical four-linkage, connected to a platform or body intended for movement by the four-linkage.

Spherical four bar linkages are well known to those skilled in the art. For example, the principle of a spherical four bar linkage, as would be known and understood by those skilled in the art, is shown and described in U.S. Pat. No. 6,213,715 col. 2, lines 20 to 49, in connection with FIGS. 1A and 1B, therein. Additionally, the principles and operation of spherical four bar linkages, as well known to those skilled in the art is shown and described in Chaing, *Kenematic of Spherical Mechanisms*, 1996 Taiwan, as listed under *Other Publications*, on the title page of as U.S. Pat. No. 6,213,715. The would be understood by those skilled in the art, the principles and operation of spherical four bar linkages, as shown and described in U.S. Pat. No. 6,213,715 and in Chaing, are incorporated by reference herein.

As known to those skilled in the art, a spherical four-bar mechanism consists of four links which are rotationally connected. A body in spherical motion moves in three degrees of freedom. The degrees of freedom, as would be understood by those skilled in the art, are interpreted as rotations about three mutually perpendicular axes passing through the center of a sphere defined by a set of spherical coordinates, constraining the spherical motion to be rotational motion. The rotations may be about a fixed axis or the instantaneous position of a moving axis. As the axes pass through the center of the sphere, the axes of the four connections of the spherical mechanisms intersect in the sphere center.

As would be understood by those skilled in the art, for a spherical mechanism defined by a spherical coordinate system, an axis of rotation is defined by a unit vector whose origin is at the center of the sphere. The unit vector defines the direction of the line about which the spherical link rotates. In spherical kinematics, a link is characterized by the great circle arc subtended by the link's two joints at the center of the sphere and the angular length of this arc is defined as the link's length. A great circle is any circle lying on the surface of a sphere whose radius is the same as the radius of the sphere.

As would be known to those skilled in the art, two great circles intersect at two points on the sphere and define a line in space. This line passes through the center of the sphere. Unit vectors originating from the sphere center along the line in either direction define the axis of rotation. FIG. 1*a* shows the intersection of four great circles and the resulting axes of rotation and FIG. 1*b* shows a spherical four-bar linkage axes and link name notation.

As would be understood by those skilled in the art, the motion of the spherical four-bar linkage, as shown in a preferred embodiment, is described as a three dimensional pattern along the surface of a virtual sphere, as defined by a spherical coordinate system, and as described, is a virtual motion, used to explain the invention.

As shown and described in a preferred embodiment, the robotic walking apparatus comprising a first single four-bar linkage may be placed in tandem in phase with a second four-bar linkage and with a third 180° degree out of phase four-bar linkage to make a hexapod.

As shown and described, according to the disclosed inventive principles, each of the robotic walking apparatus, as disclosed, may be used together in a cooperative relationship with other robotic walking apparatus, as shown and described herein.

An advantage of the disclosed invention each of tandem connected four-linkages operate as a bipod robotic walking apparatus with two feet, allowing the invention to be used as a hexapod with a maximum of three four-linkages, so three points of contact are maintained with the ground or any other surface support at a given time. As a result, only a maximum of three robotic walking apparatus, each having a spherical four-bar linkage with two feet on the coupler link, are required to achieve the advantages and results of a "hexapod" as would be known and understood to those skilled in the art.

As shown and described for a preferred embodiment, three of the inventive robotic walking apparatus are used to achieve mechanical stability with two of the inventive robotic walking apparatus operated in phase and one robotic walking apparatus operated out of phase by 180° with respect to the other two four-linkages.

As shown and described in a preferred embodiment, a first single four-bar linkage may be placed in tandem in phase with a second four-bar linkage and with a third 180° degree out of phase four-bar linkage to make a hexapod.

As would be known by those skilled in the art, a single motor directly driving a single four-bar linkage may be used to drive a combination of two or more robotic walking apparatuses, operating in tandem, for example as a hexapod.

What is shown and described is a robotic walking apparatus with a first coupler link support surface and a second coupler link support surface; a drive mechanism connected to the first coupler link support surface and to the second coupler link support surface and adapted to drive the first coupler link support surface and a second coupler link support surface in a three dimensional pattern along the surface of a sphere defined by a spherical coordinate system; and wherein the three dimensional pattern comprises horizontal motion and vertical motion.

The robotic walking apparatus is shown, wherein the drive mechanism comprises a four-bar linkage; the four bar linkage comprises rotational connections; and wherein the axes of rotation of the rotational connections intersect at the center of the sphere.

The robotic walking apparatus is shown comprising a four bar linkage and wherein the four bar linkage comprises a fixed link, a driven link, a coupler link support and a driver link or driving link; the fixed link is rotationally connected to the driven link; the driven link is rotationally connected to the coupler link support; the coupler link support is rotationally connected to the driving link; and the driving link is rotationally connected to the fixed link.

The robotic walking apparatus shown as a bipod comprises a first coupler link support surface shown as a first foot and as second coupler link support surface shown as a second foot.

The robotic walking apparatus is shown wherein the first coupler link support surface comprises a first foot and the second coupler link support surface comprises a second foot.

The robotic walking apparatus is shown wherein the four bar linkage comprises a coupler link support and wherein the first coupler link support surface and the second coupler link support surface are on opposed ends of the coupler link support.

The robotic walking apparatus is shown comprising a driven link and the coupler link support is rotationally connected to the driven link, at a location on the coupler link support opposite to the opposed ends of the coupler link support The robotic walking apparatus is shown wherein the first coupler link support surface and the second coupler link support surface are in the plane of the coupler link support.

The robotic walking apparatus is shown, wherein the first coupler link support surface and the second coupler link support surface are connected to the drive mechanism to be cyclically driven in alternate contact with a ground support surface.

The robotic walking apparatus is shown, wherein the first coupler link support surface and the second coupler link support surface are cyclically driven out of phase by Π radians.

The robotic walking apparatus is shown, wherein the first coupler link support surface and the second coupler link support surface are connected to the drive mechanism to move the drive mechanism in the horizontal direction by the force of the ground support surface against the first coupler link support surface and by the force of the ground support surface against the second coupler link support surface.

The robotic walking apparatus is shown, wherein the first coupler link support surface and the second coupler link support surface are connected to the drive mechanism to be alternately driven into contact with a ground support surface and to move the drive mechanism in the horizontal direction by the force of the ground support surface against the first coupler link support surface and by the force of the ground support surface against the second coupler link support surface.

The robotic walking apparatus is shown, wherein the first coupler link support surface comprises a first foot and the and second coupler link support surface comprises a second foot adapted to be driven in alternate contact with a ground support surface.

The robotic walking apparatus is shown, of claim 6, wherein the coupler link support is curvilinear at the location where the coupler link support is rotationally connected to the driven link.

The robotic walking apparatus is shown wherein the fixed link is rotationally connected to the driver link or driving link by a driver shaft; the driven link is rotationally connected to the coupler link support by a driven link shaft; the coupler link support is rotationally connected to the driver link by a driving link shaft and the driven link is rotationally connected to the fixed link by a fixed link shaft;

and wherein, the fixed link comprising a fixed link length, represented by the angle between the axis of the driver shaft and the axis of the driven link shaft, is 97.1 degrees;

the driving link comprising a driving link length, represented by the angle between the axis of the driver shaft and the axis of the driving link shaft, is 17.2 degrees;

the coupler link comprising a coupler link length, represented by the angle between the axis of the driving link shaft and the axis of the driven link shaft, is 96.1 degrees; and the driven link) comprising a driven link length, represented by the angle between the axis of the driven link shaft and the axis of the fixed link shaft, is 22.8 degrees.

BRIEF DESCRIPTION OF THE DRAWINGS

FIG. 2*a* shows in a wire frame schematic view, the four-bar linkage in the 0° position, as shown in FIG. 1*a*.

FIG. 2*b* shows in a wire frame schematic view the four-bar linkage at a mid position at 90°, between the 0° position as shown in FIGS. 2*a* and 1*a*, and the 180° position as shown in FIGS. 1*b* and 2*c*.

FIG. 2*c* shows in a wire frame schematic view, the four-bar linkage as shown in the 180° position as shown in FIG. 1*b*.

FIG. 2*d* shows in a wire frame schematic view, the four-linkage, in the 270° position between the 180° shown in FIGS. 1*b* and 2*c*, and the 0° position as shown in FIGS. 1*a* and 2*a*.

DESCRIPTION OF THE INVENTION

Figure 1A:
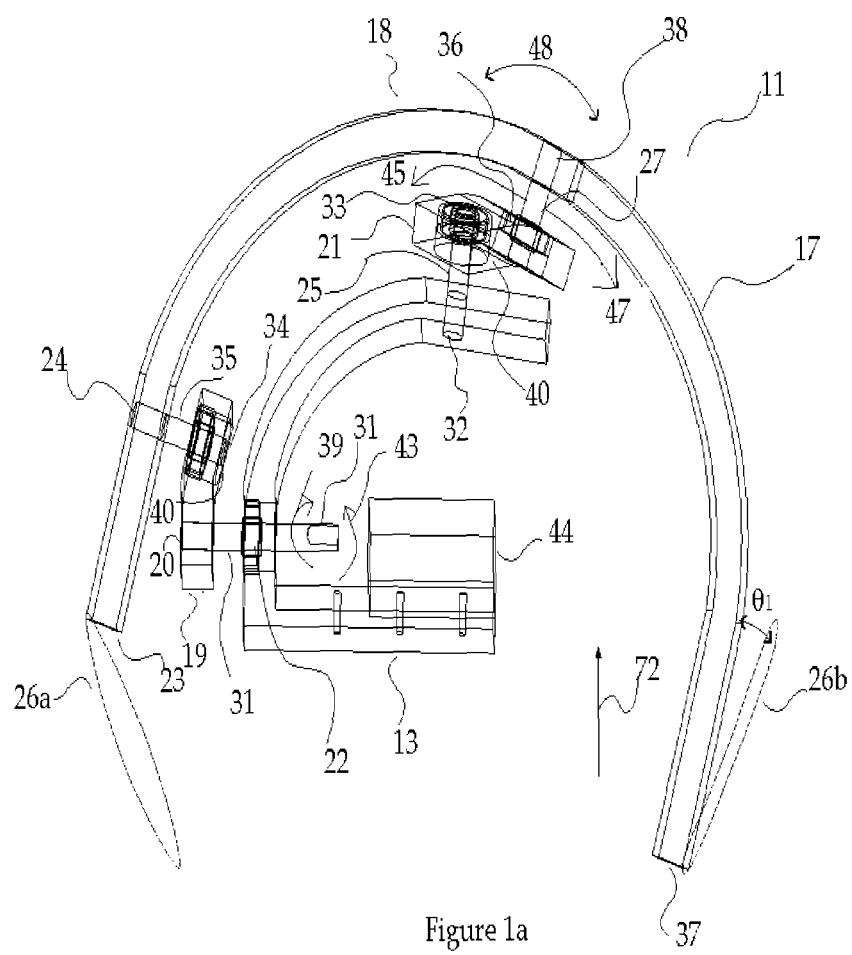
FIG. 1*a* shows in a wire frame schematic view, a robotic walking apparatus with first and second coupler link support surfaces, or feet, on opposite ends of the extended coupler link in a 0° position, as at the start of a walking cycle, with a first foot in contact with a ground support surface and the second opposite foot raised from the ground support surface.

As shown by the disclosed inventive principles and in a preferred embodiment, a four-bar linkage comprises a fixed link 13, an extended coupler link shown as coupler link support 17, a first foot shown as the first coupler link support surface 23 at a first end of the coupler link support 17, an opposed second foot shown as the second coupler link support surface 37 at a second end of the coupler link support 17, a driving link shown as an input crank 19 and a driven link shown as output link 21.

As shown and disclosed for a preferred embodiment, the spherical four-bar linkage, shown arranged as a bipod, with a first foot shown as the first coupler link support surface 23 at a first end of the coupler link support 17, and the opposed second foot shown as the second coupler link support surface 37 at a second end of the coupler link support 17.

The four-bar linkage is shown in FIG. 1a, generally by numeral 11, with a fixed link 13, serving in the disclosed preferred embodiment as a base. As would be known to those skilled in the art, the fixed link 13, may be fixed to a body, or a body may be fixed to the fixed link 13, shown for example by numeral 44, for movement of the body by the four-linkage, by, or by attachment, directly or indirectly, to any other part of main connector 13 that does not interfere with the movement of the extended coupler link shown as coupler link support 17, or with the movement of a first foot of the bipod robotic walking apparatus shown as the first coupler link support surface 23 at a first end of the coupler link support 17, or with the movement of a second foot of the bipod robotic walking apparatus shown as the second coupler link support surface 37 at a second end of the coupler link support 17, or with the driver link shown as input crank 19, or driven link shown as output link 21.

The parts as are shown in FIGS. 1b, 2a-2d, and FIGS. 3 and 4, with the same numerals as shown in FIG. 1a. Some of the numerals for parts shown in FIG. 1a, are omitted in FIGS. 1b, 2a-2d, 3 and 4, to better explain the invention, as would be understood by those skilled in the art.

As shown for a preferred embodiment, and according to the disclosed inventive principles, the robotic walking coupler link as disclosed by its inventive principles in a spherical bipod four-bar linkage 11 is arranged in a best mode and for a preferred embodiment for movement in the forward direction 72, out of the plane of FIG. 1a and away from the viewer.

Figure 1B:
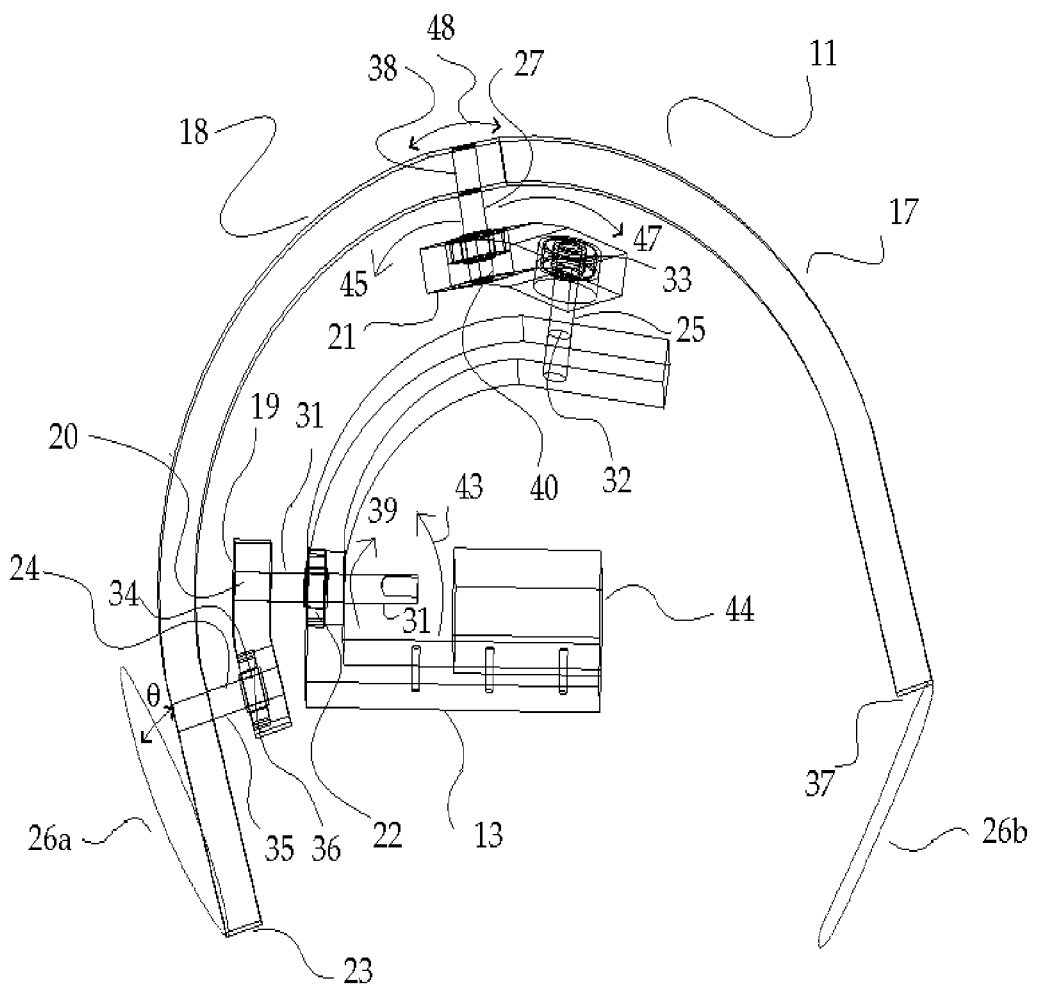
FIG. 1*b* shows in a wire frame schematic view, the robotic walking spherical four-bar linkage of FIG. 1*a*, with the four-bar linkage rotated from the 0° position, as shown in FIG. 1*a*, to the 180° position of the walking cycle, with the second opposite foot on the extended coupler link contacting the ground support surface and the first foot raised out of contact with the ground support surface.
Figure 2A:
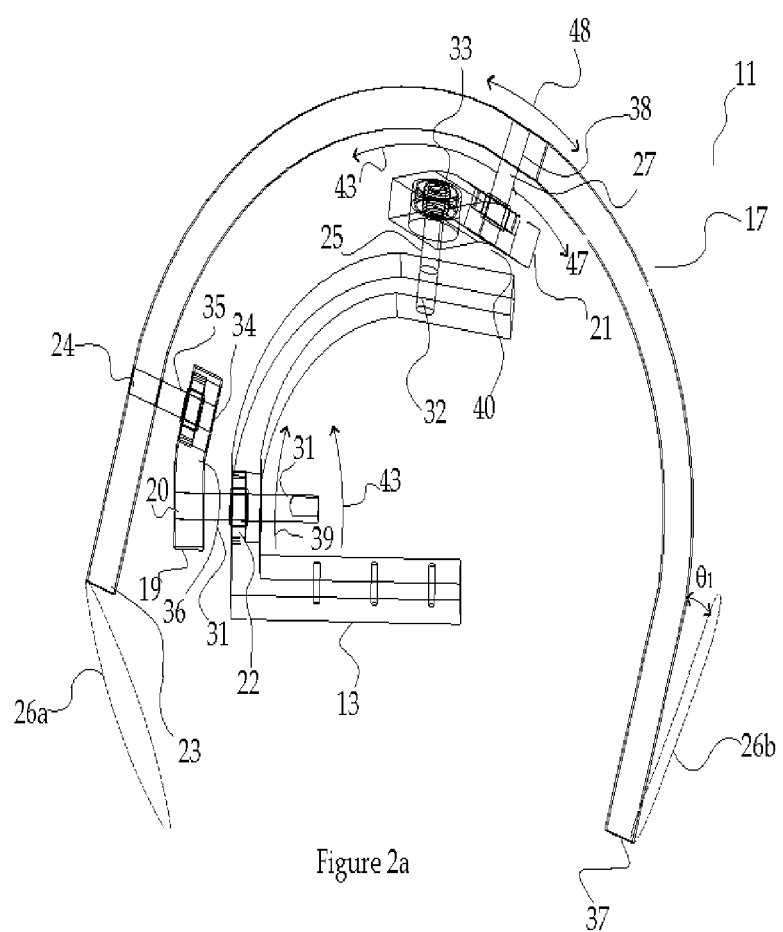
FIGS. 2*a* to 2*d*, shows in a sequential set of wire frame schematic views, the rotation of the four-linkage, in 90° increments of the walking cycle.
Figure 2B:
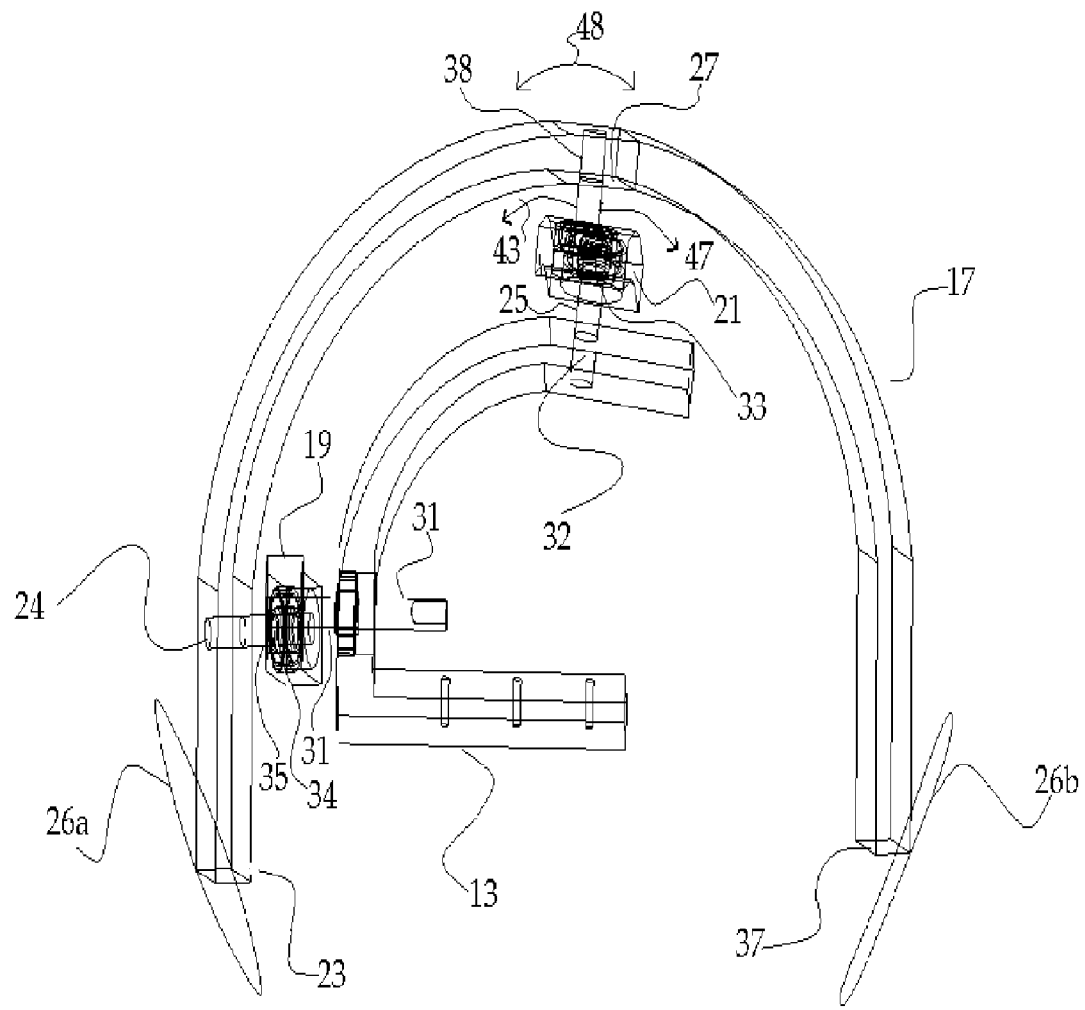
Figure 2C:
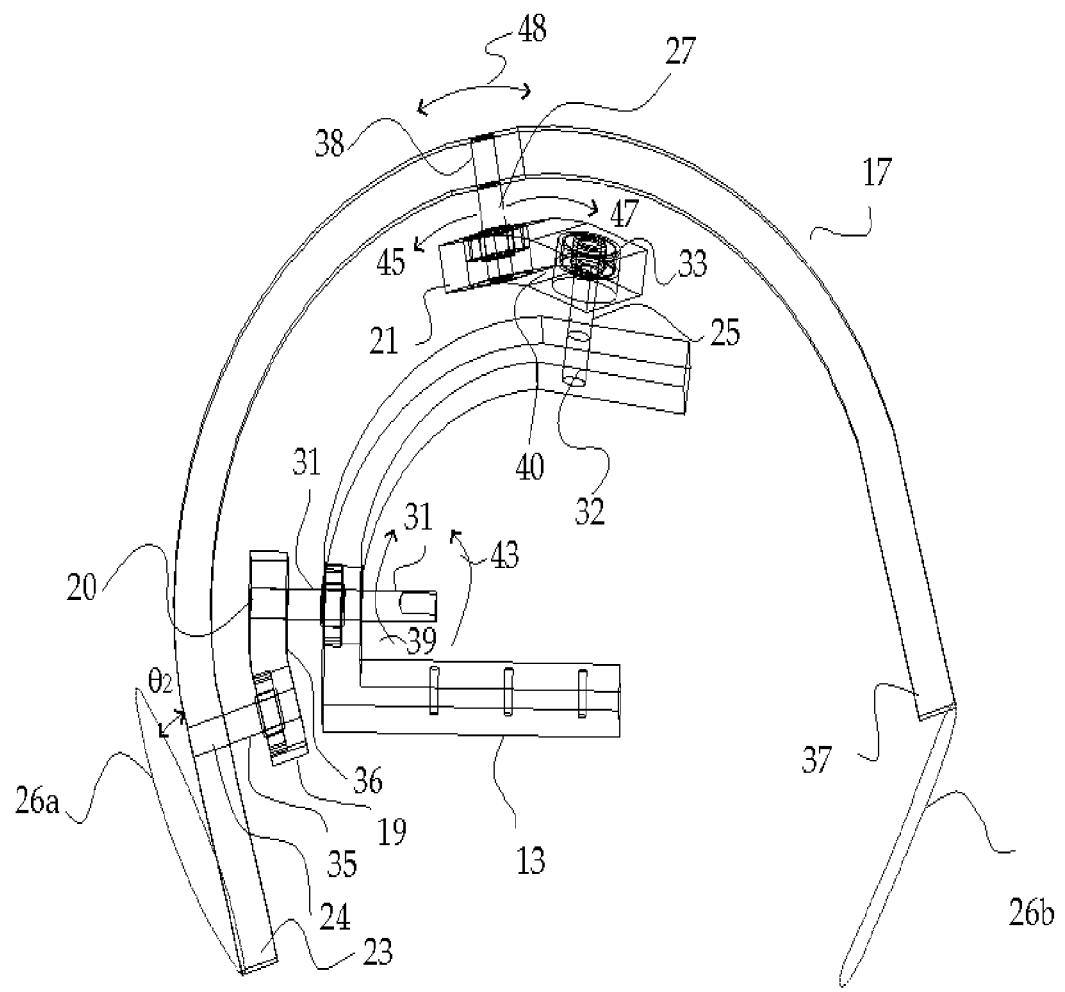
Figure 2D:
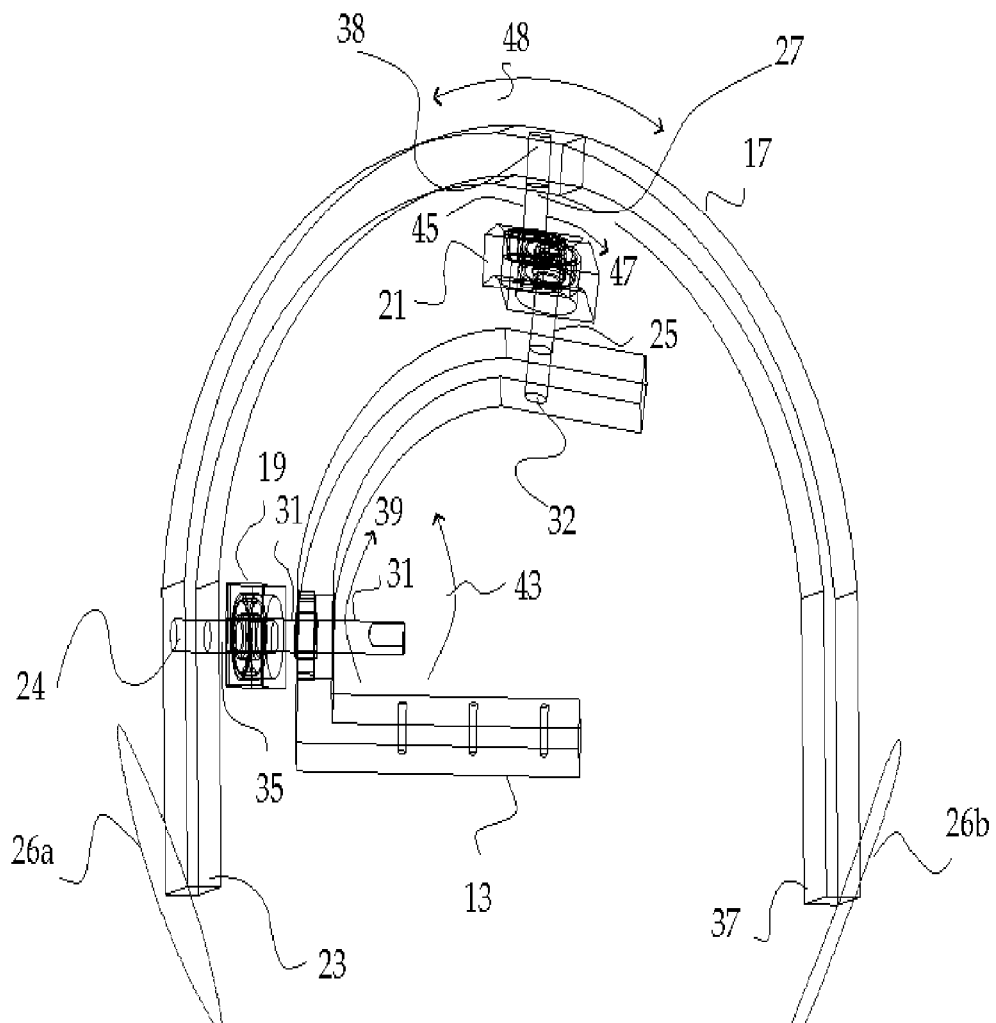
Figure 3:
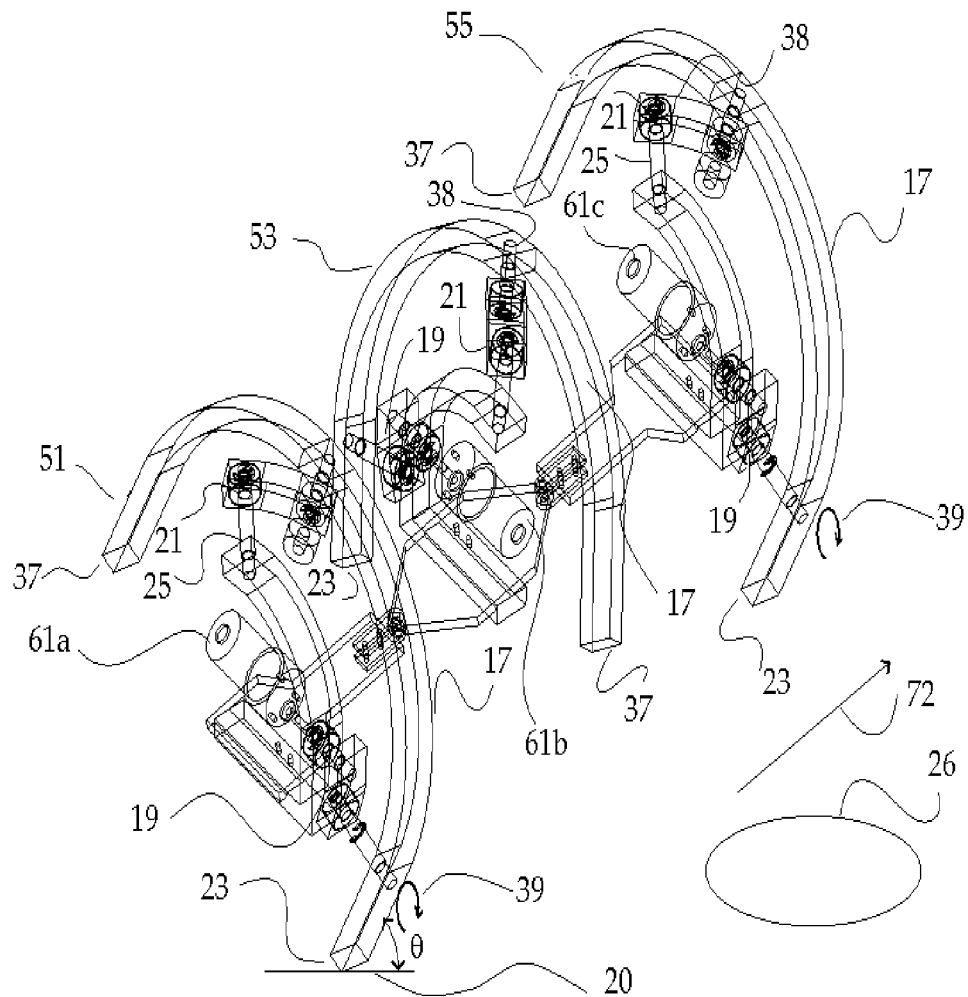
FIG. 3 shows in a wire frame schematic view, the hexapod arrangement of three of the inventive spherical four-linkages arranged in tandem to support a body with three contact points and with the cyclical operation of one inner four-bar linkage arranged 180° out of phase with cyclical operation the two outer four-linkages, and with each four-bar linkage driven by a separate respective actuator.
Figure 4:
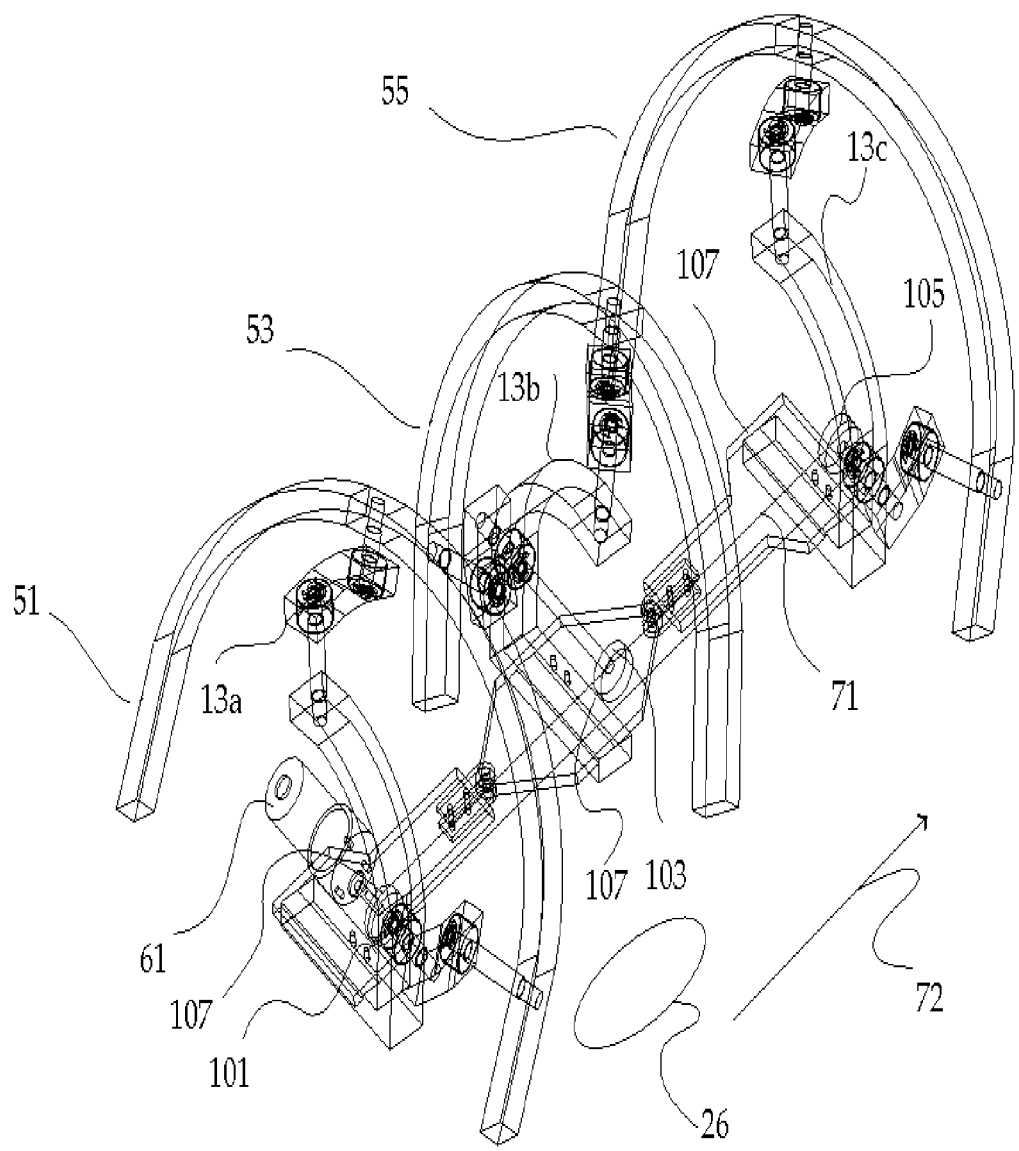
FIG. 4 shows in a wire frame schematic view, three of the inventive four-linkages, operated by a single actuator and with three of the four-linkages arranged in a tandem hexapod, as shown in FIG. 3.

As shown with reference to FIGS. 1a, 1b, and 2a-2d, ground support surfaces 20, as shown in FIGS. 3 and 4 and 26a, 26b, as shown in FIGS. 1a, 1b, and 2a-2d, are not part of the invention but show the first and second coupler link support surfaces 23 and 37 in reference to a ground support surface 20 or in the sequential rotation of the four-bar linkage through a walking cycle over the ground support surface 26a, 26b. The ground support surfaces 20, 26a, 26b may be any surface supporting traction by contact with the first and second coupler link support surfaces 23, 37 as would be understood by those skilled in the art. As would be understood by those skilled in the art, the support surfaces 26, 26a, describe in schematic form, the locus of the first coupler link support surface 23 and the second coupler link support surface 37, and are used in explanation of the disclosed invention as representative of the larger surface 20, as shown in FIGS. 3 and 4, which may be traversed by the four-linkage, operating through successive walking cycles, as shown in FIGS. 1a, 1b and 2a-2d, and as explained below.

According to the disclosed inventive principles, a walking cycle is the rotation of the input crank or driving link 19 of the spherical four-bar linkage through 2Π radians or 360°, as disclosed for a preferred embodiment, and as shown in part in FIGS. 1a, 1b, for Π radians and through a fully cycle of 2Π radians in FIGS. 2a-2d.

As shown in FIG. 1a, and FIG. 2a, the four-bar linkage 11 is shown displaced at the 0° position, with the second coupler link support surface 37 of coupler link support 17 in contact with a ground surface or other similar supporting surface 26b, and first coupler link support surface 23 raised from the support surface 26a.

As shown in FIGS. 1a and 2a, for a preferred embodiment, the coupler link support 17, is shown as curvilinear in part, as shown in FIG. 1a by numeral 18. First coupler link support surface 23 and second coupler link support surface 37, are shown extending from the curvilinear part 18 of coupler link support 17 and as shown displaced from each other, at opposed ends of the coupler link support 17.

For a preferred embodiment, the first coupler link support surface 23 and second coupler link support end 37, shown in a preferred embodiment at opposed ends of coupler link support 17, are shown the plane of the curvilinear part 18 of coupler link support 17. However, as would be apparent to those skilled in the art, coupler link support 17 may be any other one piece or multi piece construction, and may be curved or angular, and the opposed first and second support surfaces 23 and 37, may be located inside or outside the plane of the coupler link support 17, or may be spaced from the coupler link support 17 or from the ends of coupler link support 17, without departing from the disclosed inventive principles.

As shown with reference to FIG. 1a, a base shown as the fixed link 13 supports shaft 31 in a bearing 22 for rotation of shaft 31. Shaft 31 is shown connected to driver link shown as input crank 19 at fixed connection 20, for rotational movement of input crank 19 about the axis of rotation of shaft 31.

A motor or other actuator is not shown in FIG. 1a, 1b, or 2a-2d, but shown in FIGS. 3 and 4, and as would be known to one skilled in the art, may be connected to shaft 31 for driving shaft 31 and for rotating input crank 19 in rotation about shaft 31 in the rotational directions shown by arrow 39 or 43.

For the purpose of explanation, and as shown and described for a preferred embodiment, the operation of the four-bar linkage 11 is shown with reference to shaft 31 rotated in the direction shown by arrow 39.

As shown for a preferred embodiment in FIG. 1a, shaft 35 is shown connected to input crank 19 by fixed connector 34 and connected to the coupler link support 17 at bearing 24, permitting shaft 35 to rotate within bearing 24, and coupler link support 17 to rotate about shaft 24, as the driver link shown as input crank 19 rotates about shaft 31, as would be understood by those skilled in the art. However, as would be understood by those skilled in the art, the shaft 35 may be fixed to coupler link support 17 and may be connected to the input crank 19 by a rotating connection.

As shown, the driven link shown as output link 21 is rotationally supported on shaft 25 by its connection on bearing 33, spaced apart from, and opposed to, fixed connection 32, on base 13, and permitting output link 21 to rotate in an oscillating arc as shown by opposed directional arrows 45, 47.

As would be understood by those skilled in the art, the motion of coupler link support 17, is constrained by its rotating connection on shaft 27 to bearing 38 on output link 21 and by the fixed connection of shaft 27 to output link 21 at 36, permitting the shaft 27 to oscillate or rotate within bearing 38 as shown by the arcuate path 48 and coupler link support 17 to oscillate or rotate about shaft 27 in the opposed arcuate paths as shown by the arrows 45,47.

As shown in FIG. 1a, and for a preferred embodiment, the input crank 19 has an acute angular offset at 36, disposed between opposed connectors 34 and 20 so the axis of shaft 35 is arranged at an acute angle, with the axis of shaft 31.

As shown in FIG. 1a, and for a preferred embodiment, the output link 21 has an angular offset at 40, disposed between opposed connectors 33 and 36 so the axes of shafts 25 and 27, respectively are arranged at an acute angle.

As would be apparent to those skilled in the art, and according to the disclosed inventive principles, the offset angles shown for the input crank 19, at 36 and for the output link 21, at 40, may be varied, and the distance between connection 20 for shaft 31 and connection 34 for shaft 35, for the input crank 19 and the distance between connection 33 for shaft 25 and connection 36 for shaft 27, for output link 21, may be varied as necessary by size or scale variations in any application or use of the four-bar linkage 11.

The operation of the four-bar linkage is as described in the following.

The spherical four bar linkage, as shown and described for a preferred embodiment by numeral 11 in FIGS. 1a, 1b, 2a-2d and by linkages 51, 53, 55 in FIGS. 3 and 4, is shown with four separate axes of rotation.

A first fixed axis shown by the axis of shaft 31, mounted for rotation in the rotational direction shown by arrow 39, in FIG. 1a and in FIG. 3, and fixed in bearing 22, on base or fixed link 13. The first fixed axis of rotation as shown by the axis of shaft 31 passes through the fixed link 13 and the driving link of the spherical four bar linkage shown as input crank 19.

A second fixed axis is shown by the axis of shaft 25 mounted in a fixed position on the base or fixed link 13 and connected to bearing 33, supporting the driven link shown as output link 21, for rotation about the axis of shaft 25. The rotation of the output link 21 is shown in FIG. 1a by arrows 45, 47.

A third movable or moving axis of rotation, is shown by the axis of shaft 35 mounted on input crank 19 for movement of the output crank 19, by rotation about the axis of shaft 31. Shaft 35 is shown connected to the coupler link of the four bar linkage shown as coupler link support 17, at bearing 24, permitting coupler link support 17 to move and rotate about the axis of shaft 35, as shaft 35 and the axis of rotation of shaft 35 is driven by driver link 19 to rotate about the axis of rotation of shaft 31.

A fourth movable or moving axis of rotation is shown by the axis of shaft 27 mounted on output link 21, for rotation of the driven link shown as the output link 21 about the axis of shaft 25. Shaft 27 is shown connected to the coupler link shown as coupler link support 17, at bearing 38, permitting coupler link support 17 to rotate about the axis of shaft 27, as shaft 27 and the axis of rotation of shaft 27, is driven by the driven link shown as the output link 21, to rotate about the axis of rotation of shaft 25.

As would be understood by those skilled in the art of spherical mechanisms and as disclosed in U.S. Pat. No. 6,213, 713, and in Chaing, disclosed in Other Publications, therein, as disclose above, all of the of the axes of rotation as shown by the fixed axes of rotation of shafts 31 and 25, fixed in position on the base or fixed link 13, and the moving or movable axes of rotation as shown by the axes of movable axes of rotation of shafts 27 and 35, connected to the coupler link support 17, intersect the surface of respective concentric spheres and all of the axes intersect as the center of the concentric spheres.

For a preferred embodiment, as shown, the respective angles for the axes of rotation and radial lengths are shown by the following.

As shown for a preferred embodiment, the radius of the fixed link from the center of the sphere to the outer surface is 3 inches, and the angle between the connections for the driving and driven links is 97.1 degrees, with the axis of the driven link pin being parallel to the base of the mechanism. This 97.1 degree measure is referred to as the length of the fixed link.

The driving link has a radius of 4 inches from the sphere center to the outer surface, and has an angle of 17.2 degrees between the axes.

The driven link also has a radius of 4 inches and the angle between the axes is 22.8 degrees.

The coupler link has a radius of 5 inches and the angle between the axes is 96.1 degrees.

For explanation purposes and as shown in FIGS. 1a and 1b, and in FIGS. 2a and 2c, a single bipod four-bar linkage 11, according to the disclosed inventive principles is shown, generally, displaced rotationally from 0° to 180°, over Π radians for FIGS. 1a, 1b, and shown displaced in 90° increments over a for a walking cycle of 360°, over 2Π radians, and in FIGS. 2a-2d.

As described for a preferred embodiment, starting with the four-bar linkage 11 in the 0° position, as shown in FIGS. 1a and 2a, coupler link support 17, connected to shaft 31 is rotationally driven in the rotational direction of shaft 31 as shown by arrow 39 rotating input crank 19 in the direction of arrow 39.

As shown for a preferred embodiment, rotation of shaft 31 operates the four-bar linkage in the direction of movement as shown by arrow 72, away from the viewer and out of the plane of FIG. 1a, and as shown by arrow 72 in FIG. 3.

For purpose of explanation, ground support surface 26a schematically shows the area or the projected locus of movement of first coupler link support surface 23 and support surface 26b schematically shows the area or the projected locus of movement of the second coupler link support surface 37. As would be understood by those skilled in the art, the support surfaces 26, 26a, are not to scale and are shown schematically for the purpose of explanation.

As shown for the 0° position, first coupler link support surface 23 is shown raised above ground support 26a and the second coupler link support surface 37 is shown in contact with support surface 26b and at an angle $\theta_1$ with support surface 26b, as shown in FIG. 1a, 2a Rotation of driver link shown as input crank 19 in the direction of arrow 39, by Π radians or 180° as shown in FIG. 1b and FIG. 2b, and relative to the position of the input crank 19, as shown in FIG. 1a and FIG. 2a, for 0°, rotationally drives the coupler link support surface 37 from its contact with the ground support 26b to its raised position above ground support 26b, and drives first coupler link support surface 23 from its raised position relative to ground support 26a, into contact with ground support 26a, and at an angle $\theta_2$ with support surface 26a, as shown in FIGS. 1b and 2c.

As shown, and as would be understood by those skilled in the art, the movement of coupler link support 17 is constrained by the rotating connection 38 to shaft 27 on output link 21. The drive link shown as output link 21 is shown, mounted on shaft 25, by bearing 33, for rotation in an arc in the opposed directions of arrows 45, 45 as explained herein. Under the rotational movement of input crank 19, through a phase of its cyclical rotation from 0° to 180° or Π radians, and in the rotational direction of arrow 39, as shown in an example for a preferred embodiment, coupler link support 17 is constrained to move in an arc in the direction shown by arrow 45, about the axis of rotation of shaft 25, from its 0° position, as shown in FIGS. 1a and 2a to its 180° position as shown in FIGS. 1b and 2c.

Intermediate positions in the disclosed walking cycle of the four-bar linkage 11, between the 0° position and the 180° position and between 180° position and the 0° position, is shown in FIG. 2b at 90° and in FIG. 2d, at 270°.

As would be understood by those skilled in the art, and as disclosed in a preferred embodiment, under the rotational force of shaft 31 in the rotational direction shown, or example by arrow 39, approximate the 90° intermediate position, as shown in FIG. 2b in the disclosed walking cycle, the support or the four-bar linkage 11 passes from second coupler link support surface 37 to first coupler link support surface 23, as shown for the 180° position of the cycle in FIG. 1b and FIG. 2c.

Approximate the 270° intermediate position, as shown in FIG. 2d in the disclosed walking cycle, the support of the four-bar linkage passes from first coupler link support surface 23 back to second coupler link support surface 37, as shown for the 0° or 2Π position of the cycle in FIGS. 1a and 2a.

As shown for a preferred embodiment, and as would be understood by those skilled in the art, under the continuous rotation of input crank 19, in the rotational direction shown, for example by arrow 39, and as shown in FIGS. 1a, 2a, the force produced on second coupler link support 37, from its contact with support 26b, as coupler link support 17 is rotated in an arc in the direction of arrow 45, produces a force on the four-bar linkage 11, driving it in the forward direction, as shown by arrow 72.

As shown for a preferred embodiment, and as would be understood by those skilled in the art, under the continuous rotation of input crank 19, in the rotational direction shown by arrow 39, and as shown in FIGS. 1b, 2c, the force on support surface 26a, as coupler link support 17 is rotated in an arc in the direction of arrow 47, produces a force on the four-bar linkage 11, driving it in the forward direction shown by arrow 72.

As would understood by those skilled in the art, the positions shown in FIGS. 1a, 1b, and 2a-2d, for the related respective angles of rotation for the coupler link support 17, driver link shown as input crank 19, and driven link shown as output link 21, are shown in schematic views and not to scale, to illustrate the features and functions of the disclosed invention and may be varied from the respective angles of rotation as shown in FIGS. 1a, 1b, and 2a-2d, without departing from the disclosed inventive principles. For example, the oscillation or rotation of output link 21 through the arc shown by arrows 45, 47, may be varied relative to the angle of rotation of input crank 19 and output link 21, to accommodate variations in size or scale.

As would be understood by those skilled in the art, and as shown in the displacement of coupler link support 17 from the 0° position in FIG. 1a and FIG. 2a to the 180° position in FIGS. 1b and 2c, the motion of coupler link support 17 through a cycle of 2Π radians, is a complex motion comprising the superposed cyclical movement of the coupler link support 17, and first coupler link support surface 23 and second coupler link support surface 37, displaced in phase by 180° or Π radians, oscillating about shaft 25, in the opposed arcuate path as shown by arrows 45,47, and comprising the cyclical movement of coupler link support 17 and first coupler link support surface 27 and second coupler link support surface 37, displaced in phase by 180° or Π radians, oscillating about shaft 38 in the arcuate direction shown by arrow 48, and comprising the cyclical movement of first coupler link support 23 and second coupler link support 37, displaced in phase by 180° or Π radians, rotating about shaft 31, as shown by alternating contact with ground support 26a, 26b, A would be understood by those skilled in the art, the path of rotation of coupler link support surface 37 and coupler link support surface 23, about shaft 31, would be a function of the dimensions of each of links, of the spherical four-linkage.

A would be understood by those skilled in the art, the length of the arcuate path 45,47, is determined by the lengths or radii of fixed link 13, the extended coupler link support 17, input crank 19 and output link 21.

As shown the disclosed inventive principles, and in preferred embodiment, three of the four-linkages may be arranged in tandem, as shown generally four-linkages arranged 180° out of phase with the third four-linkage. As shown in FIGS. 3 and 4, the two outer four-linkages 51 and 55 are in phase and 180° out of phase with four-bar linkage 53. As would be recognized by those skilled in the art, the tandem coupling of three separate robotic walking coupler link, shown in FIG. 3, as walking coupler link 51, 53 and 55, each with first and second coupler link support surfaces 23 and 37, would be a hexapod coupler link or a tandem coupling of six coupler link support surfaces in three robotic walking coupler link of two coupler link support surfaces, each.

As shown in FIG. 3, individual actuator motors 61a, 61b, 61c, may be connected to each of the four-linkages 51, 53, 55.

As shown in FIG. 4, a single actuator motor 61 may be connected to one four-bar linkage 51 arranged in tandem to four-linkages 53, 55, by a common drive to drive all of the tandem four-linkages. As shown in FIG. 4, a drive 107, which may be a chain or belt or any other suitable device for transmitting power as would be known to those skilled in the art, is connected from driver pulley 101 in four bar linkage 51, as shown driven by motor 61, to transfer the rotational motion of motor 61 to the four bar linkages 53 and 55, by driving the respective pulleys 103 and 105.

As would be understood by those skilled in the art, the inventive principles and the claimed invention, should not be limited to the disclosed preferred embodiment. As would be understood by those skilled in the art, the inventive principles may be used or applied to equivalents of the preferred embodiments shown and described herein.

The invention claimed is:

1. A robotic walking apparatus comprising:
a first coupler link support surface and a second coupler link support surface;
a drive mechanism connected to said first coupler link support surface and to said second coupler link support surface and driving said first coupler link support surface and a second coupler link support surface in a spherical pattern;
wherein said spherical pattern comprises horizontal motion and vertical motion; and
wherein said drive mechanism comprises a four-bar linkage; said four bar linkage comprises rotational connections; and wherein the axes of rotation of said rotational connections intersect at the center of said sphere.

2. The robotic walking apparatus of claim 1, wherein said four bar linkage comprises a coupler link support and wherein said first coupler link support surface and said second coupler link support surface are on opposed ends of said coupler link support.

3. The robotic walking apparatus of claim 2, comprising a driven link and said coupler link support is rotationally connected to said driven link, at a location on said coupler link support opposite to said opposed ends of said coupler link support.

4. The robotic walking apparatus of claim 3, wherein said first coupler link support surface and said second coupler link support surface are in the plane of said coupler link support.

5. The robotic walking coupler link, of claim 3, wherein said coupler link support is curvilinear at said location where said coupler link support is rotationally connected to said driven link.

6. The robotic walking apparatus of claim 2, wherein said first coupler link support surface comprises a first foot and said and second coupler link support surface comprises a second foot adapted to be driven in alternate contact with a ground support surface.

7. A robotic walking apparatus comprising:
a first coupler link support surface and a second coupler link support surface;
a drive mechanism connected to said first coupler link support surface and to said second coupler link support surface and driving said first coupler link support surface and a second coupler link support surface in a spherical pattern; and
a four bar linkage and wherein said four bar linkage comprises a fixed link, a driven link, a coupler link support and a driving link; said fixed link is rotationally connected to said driven link; said driven link is rotationally connected to said coupler link support; said coupler link support is rotationally connected to said driving link; and said driving link is rotationally connected to said fixed link;
wherein said spherical pattern comprises horizontal motion and vertical motion.

8. The robotic walking apparatus of claim 7, wherein said fixed link is rotationally connected to said driving link by a driver shaft; said driven link is rotationally connected to said coupler link support by a driven link shaft; said coupler link support is rotationally connected to said driving link by a driving link shaft and said driven link is rotationally connected to said fixed link by a fixed link shaft;
and wherein,
said fixed link comprising a fixed link length, represented by the angle between the axis of said driver shaft and the axis of said driven link shaft, is 97.1 degrees;
said driving link comprising a driving link length, represented by the angle between the axis of said driver shaft and the axis of said driving link shaft, is 17.2 degrees;
said coupler link comprising a coupler link length, represented by the angle between the axis of the driving link shaft and the axis of said driven link shaft, is 96.1 degrees; and
said driven link) comprising a driven link length, represented by the angle between the axis of said driven link shaft and the axis of said fixed link shaft, is 22.8 degrees.

9. A robotic walking apparatus comprising:
a first coupler link support surface and a second coupler link support surface;
a drive mechanism connected to said first coupler link support surface and to said second coupler link support surface and driving said first coupler link support surface and a second coupler link support surface in a spherical pattern;
wherein said spherical pattern comprises horizontal motion and vertical motion; and
wherein said first coupler link support surface and said second coupler link support surface are connected to said drive mechanism to be cyclically driven in alternate contact with a ground support surface.

10. The robotic walking apparatus of claim 9, wherein said first coupler link support surface and said second coupler link support surface are cyclically driven out of phase by n radians.

11. The robotic walking apparatus of claim 10, wherein said first coupler link support surface and said second coupler link support surface are connected to said drive mechanism to move said drive mechanism in said horizontal direction by the force of said first coupler link support surface against said ground support surface and by the force of said second coupler link support surface ground against said support surface.

12. A robotic walking apparatus comprising:
a first coupler link support surface and a second coupler link support surface;
a drive mechanism connected to said first coupler link support surface and to said second coupler link support surface and driving said first coupler link support surface and a second coupler link support surface in a spherical pattern;
wherein said spherical pattern comprises horizontal motion and vertical motion; and
wherein said first coupler link support surface and said second coupler link support surface are connected to said drive mechanism to be alternately driven into contact with a ground support surface and to move said drive mechanism in said horizontal direction by the force of said first coupler link support surface against said ground support surface and by the force of said second coupler link support surface against said ground support surface.

13. A robotic walking apparatus comprising:
a first coupler link support surface and a second coupler link support surface;
a drive mechanism connected to said first coupler link support surface and to said second coupler link support surface and driving said first coupler link support surface and a second coupler link support surface in a spherical pattern; and
a single bipod support, and wherein said single bipod support includes said first coupler link support surface and includes said second coupler link support surface;
wherein said spherical pattern comprises horizontal motion and vertical motion.

14. The robotic walking apparatus of claim 13, wherein said single bipod support is connected to said drive mechanism to cyclically drive said first coupler link support surface and said second coupler link support surface in alternate contact with a ground support surface.

15. The robotic walking apparatus of claim 14, wherein said first coupler link support surface and said second coupler link support surface are adapted to be cyclically driven out of phase by $\pi$ radians.

16. A robotic walking apparatus comprising:
a first coupler link support surface and a second coupler link support surface;
a drive mechanism connected to said first coupler link support surface and to said second coupler link support surface and driving said first coupler link support surface and a second coupler link support surface in a spherical pattern; and
a first single bipod support, a second single bipod support, and third single bipod support;
wherein said first, said second, and said third, bipod supports each include a respective first coupler link support surface and a second coupler link support surface;
said first, second, and said third single bipod supports are connected in tandem to said drive mechanism and adapted to be cyclically driven by said first coupler link support surface and said second coupler link support surface, of each of said first single bipod support, said second single bipod support and said third single bipod support, in alternate contact with a ground support surface;
and wherein said first coupler link support surfaces and said second coupler link support surfaces, of said first single bipod support and of said third single bipod support are adapted to be cyclically driven in phase and said first coupler link support surface and said second coupler link support surface of said second single bipod support is adapted to be cyclically driven out of phase, with first coupler link support surfaces and said second coupler link support surfaces of said first single bipod support and said third single bipod support;

wherein said spherical pattern comprises horizontal motion and vertical motion.

17. The robotic walking apparatus of claim 16, wherein said first coupler link support surface and said second coupler link support surface of said second single bipod support is adapted to be cyclically driven out of phase, with first coupler link support surfaces and said second coupler link support surfaces of said first single bipod support and said third single bipod support, by $\pi$ radians.

18. A robotic walking apparatus comprising,
a first single bipod support, a second single bipod support, and third single bipod support;
wherein said first, said second, and said third, bipod supports each include a first coupler link support surface and a second coupler link support surface;
a first drive mechanism connected to said first single bipod support, a second drive mechanism connected to said second single bipod support, and a third drive mechanism connected to said third single bipod support driving said first coupler link support surfaces and said second coupler link support surfaces of each of said respective said first single bipod support, said second single bipod support, and said third single bipod support, in a spherical pattern; and wherein said spherical pattern comprises horizontal motion and vertical motion; and
wherein said first coupler link support surfaces and said second coupler link support surfaces, of said first single bipod support and said third single bipod support, are adapted to be cyclically driven in phase in alternate contact with a ground support surface and said first coupler link support surface and said second coupler link support surface of said second single bipod support are adapted to be cyclically in alternate contact with a ground support surface, out of phase, with said first coupler link support surfaces and said second coupler link support surfaces of said first single bipod support and said third single bipod support.

* * * * *